United States Patent [19]

Urano

[11] 4,289,218
[45] Sep. 15, 1981

[54] MECHANICAL MOTION-SNUBBING DEVICE

[75] Inventor: Takayuki Urano, Kanagawa, Japan

[73] Assignee: NHK Spring Co., Ltd., Yokohama, Japan

[21] Appl. No.: 50,771

[22] Filed: Jun. 21, 1979

[30] Foreign Application Priority Data

Oct. 6, 1978 [JP] Japan .................... 53-122729

[51] Int. Cl.³ .............................................. B60T 7/12
[52] U.S. Cl. ...................................... 188/134; 248/49; 248/58; 248/550
[58] Field of Search .................. 188/1 B, 134; 248/49, 248/58, 550

[56] References Cited

U.S. PATENT DOCUMENTS

| | | | |
|---|---|---|---|
| 2,783,861 | 3/1957 | Lungles | 188/134 X |
| 3,727,431 | 4/1973 | Yokel | 188/1 B X |
| 3,876,040 | 4/1975 | Yang | 188/1 B |
| 3,983,965 | 10/1976 | Wright, Jr. | 188/1 B |
| 4,094,387 | 6/1978 | Pelot et al. | 188/1 B |
| 4,103,760 | 8/1978 | Yang | 188/1 B |
| 4,173,158 | 11/1979 | Geislinger | 188/1 B X |

Primary Examiner—George E.A. Halvosa
Attorney, Agent, or Firm—Frishauf, Holtz, Goodman & Woodward

[57] ABSTRACT

A mechanical motion-snubbing device, which is set between a supported member, such as a pipe, and a supporting member, such as a structure, and comprises a pair of telescoped members, axial movement of one of the telescoped members being transmitted to a shaft as a force for its rotation; a first inertia member on one end of the shaft, the first inertia member having a peripheral surface which is provided with a plurality of segmental projections; a second inertia member having a cylindrical bore for receiving the first inertia member and being rotatably supported on the shaft; and segmental cutouts formed in the inner wall of the cylindrical bore of the second inertia member to be loosely engaged with said segmental projections, thereby causing said projections to be rotated in the circumferential direction of the second inertia member.

10 Claims, 10 Drawing Figures

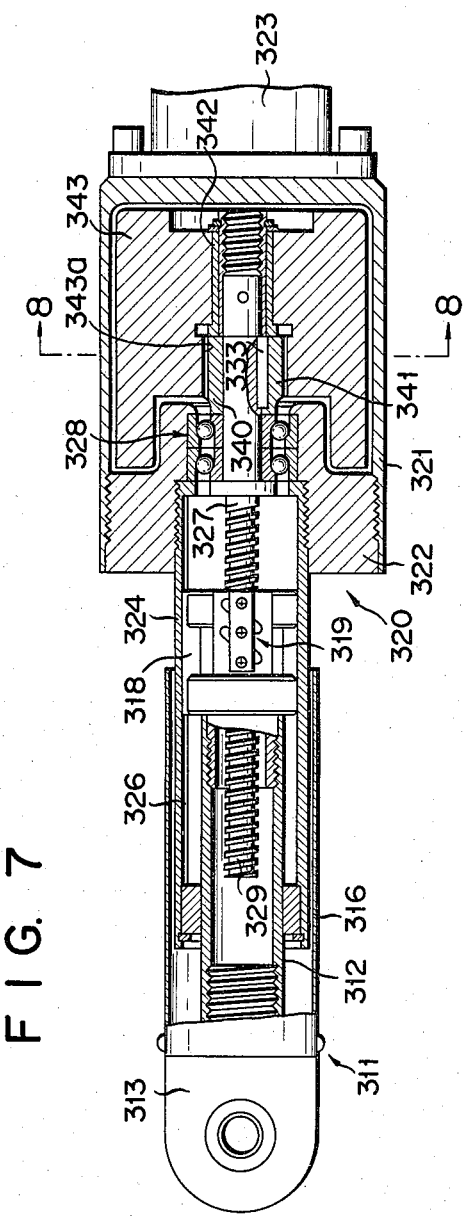
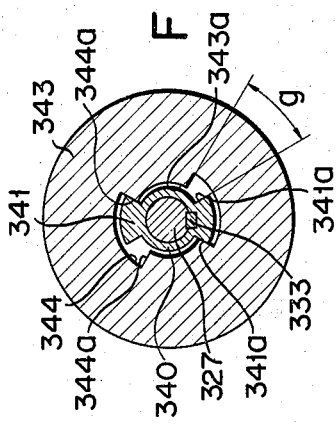

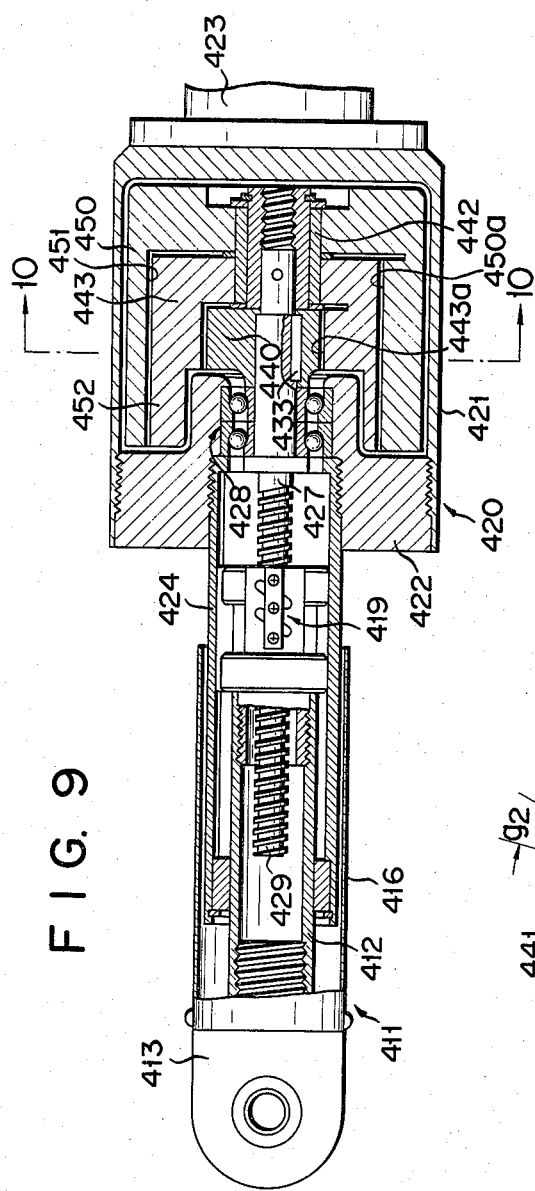
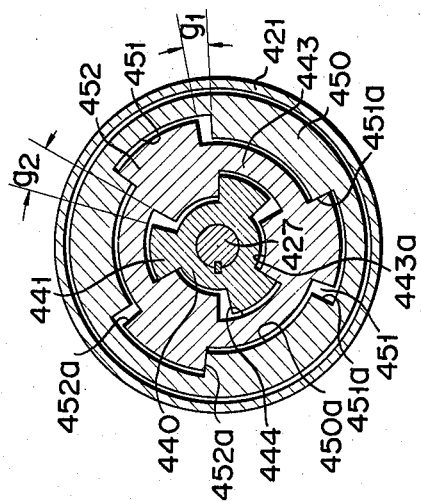

MECHANICAL MOTION-SNUBBING DEVICE

BACKGROUND OF THE INVENTION

This invention relates to a mechanical motion-snubbing device or mechanical shock arrestor which is disposed between a supporting member and a supported member to suppress the accelerated displacement of the supported member relative to the supporting structure.

Supported members, for example, pipes built in various plants like chemical plants, steam power plants, and atomic power plants are permitted to be slowly displaced due to, for example, temperature changes. However, it is necessary to protect these pipes from accelerated displacement, particularly vibrations resulting from, for example, earthquakes or any other sudden external shocks. To this end, therefore, pipes are generally securely held on supporting members such as plant structures by means of a mechanical motion-snubbing device.

Such mechanical motion-snubbing devices known to date include a spring type using a buffer spring, oil pressure-actuated type, and friction brake type.

Even when a supported member, for example, a pipe is displaced slowly, the spring type snubbing device applies a reactionary force corresponding to said displacement on the pipe, undesirably increasing the internal stresses of the pipe body itself.

With the oil pressure type snubbing device, it is necessary to periodically replace operation oil due to its relatively early deterioration, and nonmetal parts such as packings due to their low durability. Particularly where the snubbing device is set in an area contaminated by high energy radiation, the difficulties arise that the above-mentioned operation oil and nonmetal parts more noticeably lose their functions.

To resolve such drawbacks, a friction brake type snubbing device has been proposed which consists of a capstan spring combined with an inertia mass (U.S. Pat. No. 3,876,040). This proposed friction brake type snubbing device indeed has considerably great advantages over the aforesaid two types of snubbing devices. But said friction brake type snubbing device is disadvantageous in that the device has a complicated arrangement and is relatively expensive. Further, the following problems are raised with the proposed friction brake type snubbing device. This known snubbing device makes a nonlinear response to the acceleration of external shocks and presents great difficulties in accurately analyzing the displacements or vibrations of pipes or the earthquakeproof property thereof, thus failing to ensure the safety of pipes.

It is accordingly the object of this invention to provide a compact, highly durable, mechanical motion-snubbing device or mechanical shock arrestor of simple arrangement and light weight, free from material liable to be deteriorated by high energy radiation, saved from the occurrence of resonance, and further capable of accurately analyzing the earthquakeproof property of supported members, for example, pipes, effectively suppressing their displacements or vibrations and consequently well adapted to be used therewith.

SUMMARY OF THE INVENTION

To this end, this invention provides a mechanical motion-snubbing device which comprises: a pair of telescoped members mounted for relative axial movement with respect to each other; means for converting the relative axial movement of the telescoped members into a rotation; an axially fixed shaft supported by one of the telescoped members so as to be rotated by the movement-converting means; a first inertia member fixed to the shaft; an axially fixed second inertia member substantially freely rotatable on an axis of the shaft; a cylindrical casing fixed to the other of the telescoped members to house the first and second inertia members; a plurality of segmental cutouts formed in one of the first and second inertia members, the cutouts being formed substantially equiangularly in the circumferential direction of the one inertia member, each of the cutouts defining a pair of collision planes spaced from each other in the circumferential direction; and a corresponding plurality of segmental projections formed on the other of the first and second inertia members substantially equiangularly in the circumferential direction thereof so as to fit into respective corresponding cutouts with a predetermined space left therebetween, each of the projections defining a pair of collision planes spaced from each other in the circumferential direction and facing corresponding collision planes of the cutouts; whereby upon application of a sudden external force both collision planes of each projection alternately strike against a corresponding collision plane of each respective cutout to produce a composite inertia moment of the first and second inertia members and to effect absorbing energy of the external force.

With the mechanical motion-snubbing device of this invention arranged as described above, one of the telescoped members is connected to a supporting member such as a structure, and the other to a supported member, for example, a pipe. Where the supported member applies a gentle force to the snubbing device, then the second inertia member rotates with the first inertia member by the means for effecting their relative rotations, thereby allowing for the movement or shifting of the supported member. Where the supported member applies a sudden force to the snubbing device, then the first inertia member rotates, while repeatedly striking against the second inertia member. Therefore, an external shock energy is absorbed by collisions between both inertia members. In this case, the inertia mass of the second inertia member acts on the first inertia member, thus producing a composite inertia moment. As a result, rapid displacements or vibrations of a supported member are effectively suppressed.

Where a gentle external force is applied to the snubbing device, the segmental projections slowly rotate with the inertia mass in a state fitted into the corresponding segmental cutouts. Where the snubbing device undergoes a sudden external shock, then the rapidly swinging projection repeatedly strikes against the inner collision walls of the cutout in the inertia mass, thereby effectively absorbing the external shock due to a composite inertia force derived from the inertia of the inertia mass and that of the rotary shaft itself.

BRIEF DESCRIPTION OF THE DRAWING

FIG. 7 is a longitudinal sectional view of a mechanical motion-snubbing device according to a second embodiment of the invention;

FIG. 8 is a sectional view on line 8—8 of FIG. 7;

FIG. 9 is a longitudinal sectional view of a mechanical motion-snubbing device according to a third embodiment of the invention which is provided with an additional inertia mass; and FIG. 10 is a sectional view on line 10—10 of FIG. 9.

DETAILED DESCRIPTION

Figure 1:
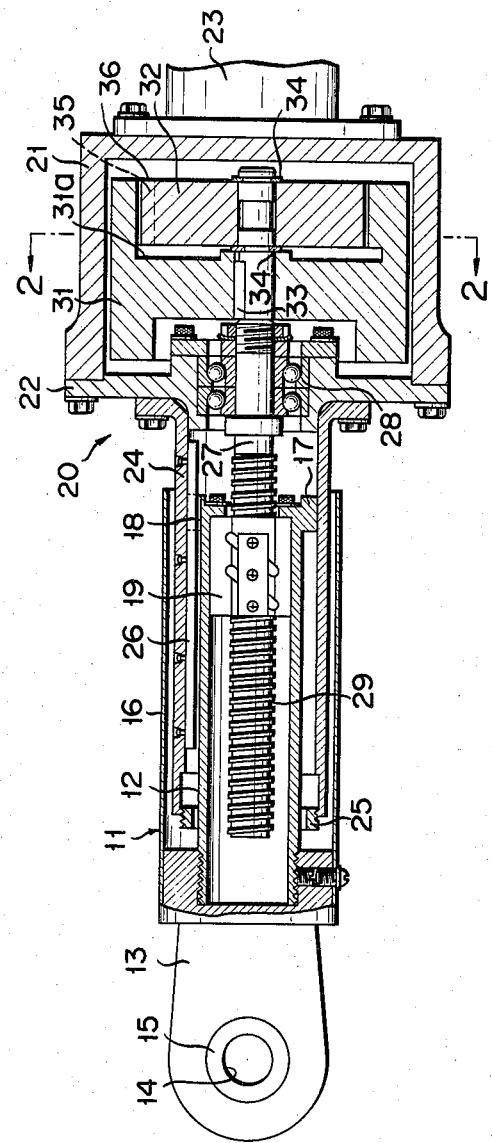
FIG. 1 is a longitudinal sectional view of a mechanical motion-snubbing device according to a first embodiment of this invention.

Referring to FIG. 1, a first assembly 11 comprises a cylinder 12. The left end of the cylinder 12 (as indicated in FIG. 1) is fixed to a fitting member 13. The fitting member 13 comprises a spherical bearing 15 and a cylindrical protective cover 16 concentrically disposed with the cylinder 12. The cylinder 12 has a flange 17 formed at the right end (as indicated in FIG. 1). The flange 17 is provided with a keyway 18 extending axially of the snubbing device. The cylinder 12 is provided at the right end with a housing 19 of a plurality of ball bearings. The ball bearings cooperate with the threads of the later described shaft 27 to constitute a so-called ball-screw mechanism for converting the telescopic motion of the first assembly 11 into a rotational motion.

A second assembly 20 comprises a cylindrical body 21 open at one end thereof and a plate 22 for closing said open end. Said open end of the cylindrical body 21 is provided with a fitting member 23 projecting outward (toward the right side of FIG. 1) from the subject snubbing device. The second assembly 20 further includes later described members. Fixed to the cover plate 22 is the base end (or the right side end as indicated in FIG. 1) of a cylinder 24 in a state projecting outward (toward the left side of FIG. 1). One end portion of the cylinder 24 is inserted concentrically between the cylinder 12 and protective cover 16. The outer end of the cylinder 24 is fitted with a stop ring 25. A key 26 extending axially of the snubbing device is formed on the inner wall of the cylinder 24 for engagement with the aforesaid keyway 18. Consequently both cylinders 12, 24 can be telescopically moved axially of the snubbing device, but are prevented from being relatively rotated with respect to each other. This description also applies to the first and second assemblies 11, 20.

The second assembly 20 comprises a rotary shaft 27. This shaft 27 is supported by the cover plate 22 rotatably by means of ball bearings 28, but substantially immovably axially of the snubbing device. The left side end (FIG. 1) of the shaft 27 is inserted into the cylinder 12 concentrically therewith. Threads 29 are axially formed on the peripheral surface of the inserted end portion of the shaft 27 for engagement with the ball-screw mechanism 19.

A first inertia member or first flywheel 31 and a second inertia member or second flywheel 32 are concentrically set on that portion of the rotary shaft 27 which lies opposite to the threaded portion 29, namely, is extended into the cylindrical body 21. The first inertia member or first flywheel 31 is fitted to the rotary shaft 27 for joint rotation therewith by means of a key-and-keyway system 33. The second inertia member or second flywheel 32 having a smaller diameter than the first inertia member or first flywheel 31 is rotatably supported on the base end portion of the shaft 27. A snap ring 34 is fitted to the shaft 27 for each of the first and second inertia members 31, 32 to prevent them from being axially shifted.

The first inertia member or first flywheel 31 has a cylindrical bore 31a open on one side thereof. The second inertia member or second flywheel 32 is received in said bore 31a. Both flywheels 31, 32 are assembled in a very compact form. This assembly is housed in the cylindrical body 21 with a very narrow clearance.

Figure 2:
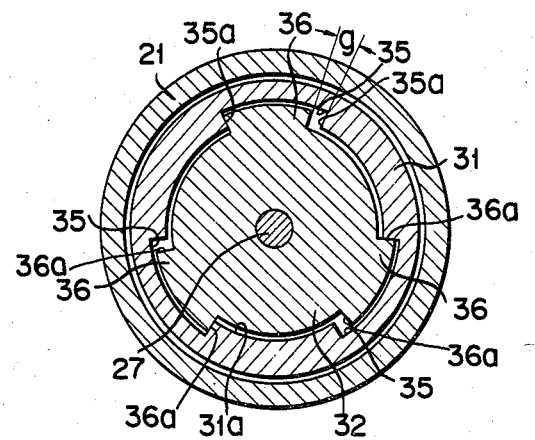
FIG. 2 is a sectional view on line 2—2 of FIG. 1.

As seen from FIG. 2, a plurality of (three in this embodiment) segmental cutouts 35 are formed in the inner wall of the bore 31a of the first inertia member or first flywheel 31 in the form of axially extending keyways. These three segmental cutouts are equiangularly arranged in the circumferential direction of the first intertia member or first flywheel 31, that is, at an interval of 120°. Both end faces 35a, 35a of the respective segmental cutouts 35 are so formed that the extensions of all the end faces 35a converge at the center of the shaft 27.

As apparent from FIG. 2, a plurality of (three in this embodiment) segmental projections 36 are integrally formed on the outer peripheral surface of the second intertia or second flywheel 32 equiangularly (120°) in the circumferential direction thereof to ensure an accurate engagement with the above-mentioned three segmental cutouts 35. Therefore, the second intertia member or second flywheel 32 is shaped like a spline shaft. Both end faces 36a, 36a of the respective segmental projections 36 are so formed that the extensions of all the end faces 36a converge at the center of the shaft 27. In this case, however, the end faces 36a of the respective projections 36 define a smaller angle of circumference with the center of the shaft 27 to provide a free space (g) in the respective segmental cutouts 35. Consequently, the first and second inertia members or first and second flywheels 31, 32 can be rotated relatively with respect to each other to the extent of said free space (g). This arrangement is the unique feature of this invention. The assembly of segmental cutouts or keyways 35 and segmental projections or keys 36 provided between the inner peripheral surface of the first inertia member or first flywheel 31 and the outer peripheral surface of the second inertia member or second flywheel 32 is hereinafter referred to as "relatively rotatable engagement means". Both end faces 35a, 35a of the respective segmental cutouts 35 and both end faces 36a, 36a of the respective segmental projections 36 are designed to strike against each other when an accelerated external shock is applied to a supported member, for example, a pipe. Therefore, these two groups 35a, 36a of the end faces are hereinafter referred to as "collision planes".

Figure 3:
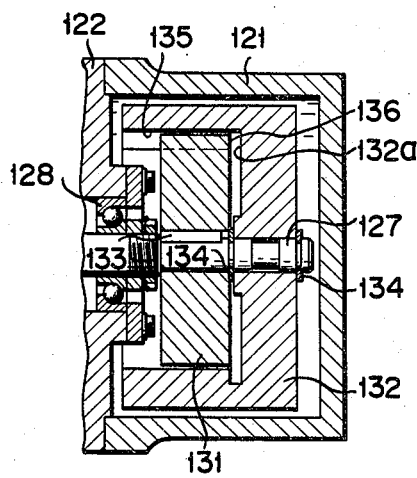
FIG. 3 is a fractional sectional view of first and second inertia members modified from FIG. 1.
Figure 4:
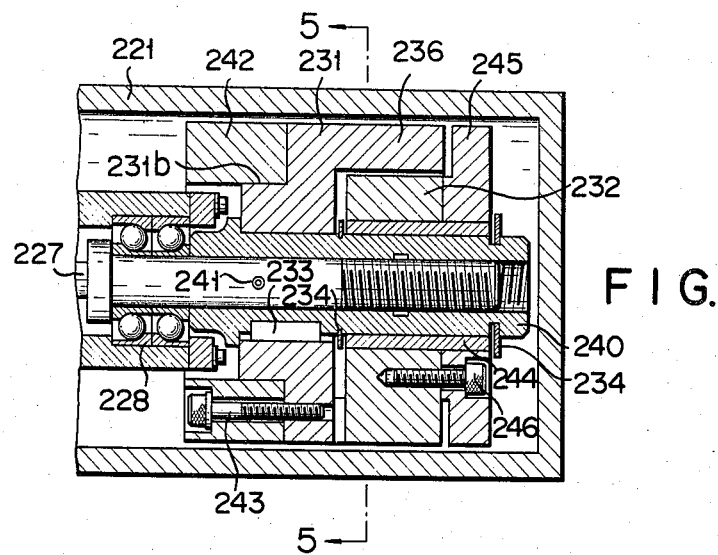
FIG. 4 is a fractional sectional view of first and second inertia members modified from FIG. 1 by being respectively fitted with an inertia mass.
Figure 5:
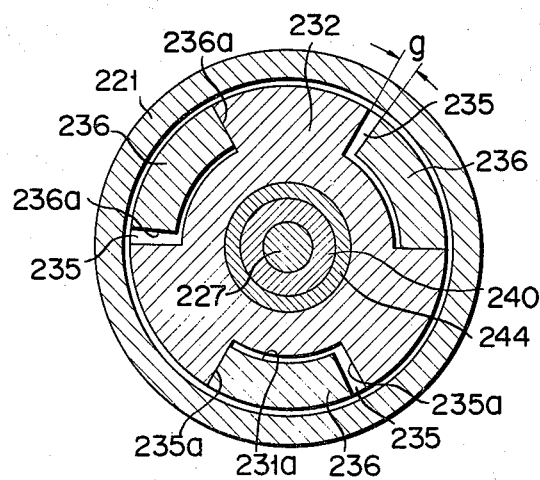
FIG. 5 is a sectional view on line 5—5 of FIG. 4.

The first and second inertia member or first and second flywheels of FIGS. 1 and 2 according to the first embodiment of this invention can be arranged like the modifications of FIGS. 3, 4 and 5.

The members of the modification of FIG. 3 the same as those of FIG. 1 are denoted by the numerals formed by adding a number 100 to the numerals of the members of FIG. 1. With the modification of FIG. 3, the first inertia member or first flywheel 131 and second inertia member or second flywheel 132 have the opposite shapes to those of the first embodiment of FIGS. 1 and 2. Namely, the second intertia member or second flywheel 132 has a larger diameter than the first inertia member or first flywheel 131, and is provided with a cylindrical bore 132a, in which the first inertia member or first flywheel 131 is received. As illustrated in FIG. 2, segmental projections 136 are formed on the peripheral surface of the first inertia member or first flywheel 131, and segmental cutout 135 are formed in the inner wall of the bore 132a of the second inertia member or second flywheel 132.

The parts of the modification of FIGS. 4 and 5 the same as those of the first embodiment of FIGS. 1 and 2 are denoted by numerals formed by adding a number 200 to the numerals of the members of the first embodiment.

Referring to the modification of FIGS. 4 and 5, a collar 240 is threadedly fitted to a rotary shaft 227 in a state made non-rotatable about the shaft 227 by means of a pin 241. The first inertia member or first flywheel 231 is fixed to the surface of the collar 240 by means of a key-and-keyway system 233 to be rotated jointly with the shaft 227. A stepped portion 231b having a small diameter is formed on one side of the first inertia member or first flywheel 231. An annular additional inertia mass 242 is detachably engaged with said stepped portion 231b by means of a bolt 243. The first inertia member or first flywheel 231 and additional inertia mass constitute first inertia means. A plurality of (three in the embodiment of FIGS. 4 and 5) axially extending segmental projections 236 are formed on the peripheral edge of the other side of the first inertia member or first flywheel 231 equiangularly (120°) in the circumferential direction. Therefore, the three segmental projections 236 can be regarded jointly to define a cylindrical bore 231a in the first inertia member or first flywheel 231, though the wall of said bore 231a is not made consecutive, because the segmental projections 236 are appreciably spaced from each other in the circumferential direction.

The second inertia member or second flywheel 232 is set in the cylindrical bore 231a. This second inertia member or second flywheel 232 is rotatably supported on the shaft 227 by means of a bush 244. An additional inertia mass 245 is detachably fitted to one side of the second inertia member or second flywheel 232 by means of a bolt 246.

As illustrated in FIG. 5, a plurality of (three in the embodiment of FIGS. 4 and 5) segmental cutouts 235 are formed in the peripheral portion of the second inertia member or second flywheel 232 equiangularly (120°) in the circumferential direction. The segmental projections 236 of the first inertia member or first flywheel 231 are engaged with the corresponding cutouts 235 of the second inertia member or second flywheel 232. The cutouts 235 respectively have a slightly greater circumferential length than the projections 236 to provide a space (g) therebetween. Therefore, the first and second inertia members or first and second flywheels 231, 232 are allowed to be relativey rotated with respect to each other to the extent of said space (g).

Both collision planes 236a of the respective projections 236 and both collision planes 235a of the respective cutouts 235 face each other. The extensions of these collision planes 236a, 235a converge at the center of the rotary shaft 227.

The additionally provided inertia masses 242, 245 impart a proper inertia force to the corresponding inertia members or flywheels 231, 232. If the weights of the additionally provided inertia masses 242, 245 are selected in conformity to the requirements demanded of a mechanical motion-snubbing device to be used, then the device can obtain various desired levels of inertia. The additionally provided inertia masses 242, 245 may be made of material the same as or different from that of the first and second inertia members or first and second flywheels 231, 232. To establish a proper mechanical balance between the rotary shaft 227 and the first and second inertia means, it is preferred that the additionally provided inertia masses 242, 245 be made of material whose weight is distributed as uniformly possible.

Figure 6:
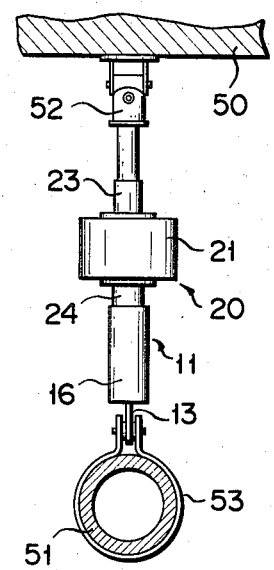
FIG. 6 illustrates the manner in which a mechanical motion-snubbing device embodying the invention is set between a supporting member for example, a structure, and a supported member, for example, a pipe.

A mechanical motion-snubbing device embodying this invention which is arranged as described above is fitted to a supported member as illustrated in FIG. 6, in which the snubbing device is set between a supported pipe 51 and a supporting structure 50. In FIG. 6, the pipe 51 is suspended from the structure 50 by means of the snubbing device. Obviously, the manner in which the snubbing device is applied is reversed from FIG. 6. Namely, it is possible to support a supported member, for example, a pipe built above a stationary supporting member, for example, the ground, or floor by the subject snubbing device disposed therebetween.

Referring to FIG. 6, one fitting member 23 of the snubbing device is linked with a fitting member 52 fixed to the supporting structure 50. The other fitting member 13 of the snubbing device is linked with a clamp 53 wound about the supported pipe 51.

Now let it be assumed that under the above-mentioned supported condition, the pipe 51 is moved vertically relative to the stationary supporting structure 50. Then, the first and second assemblies 11, 20 are relatively displaced with respect to each other axially of the snubbing device.

When the first assembly 11 is axially moved, the ballscrew mechanism 19 is shifted therewith, giving rise to the rotation of the shaft 17. Where the pipe 51 is slightly displaced due to, for example, temperature changes, the shaft 17 accordingly makes a slow rotation. As a result, the first inertia member or first flywheel 31 rotated jointly with the shaft 17 is lightly engaged with the second inertia member or second flywheel 32 for joint rotation. Namely, one of the collision planes 35a of the segmental cutouts 35 formed in the inner wall of the first inertia member or first flywheel 31 urges the corresponding collision planes 36a of the projection 36 of the second inertia member or second flywheel 32. As a result, both inertia members or flywheels 31, 32 slowly rotate jointly.

In this case, the snubbing device does not apply a resistive force to suppress the slow displacement of the supported pipe 51. Where, however, the pipe 51 is violently shaken and prominently displaced vertically due to, for example, an earthquake, in other words, the pipe makes a highly accelerated displacement, then the fist inertia member or first flywheel 31 quickly swings back and forth. As a result, both collision planes 35a of the respective cutouts 35 of the first inertia member or first flywheel 31 alternately strike against both collision planes 36a of the projections 36 of the second inertia or second flywheel 32. These collisions are quickly repeated. At this time, the second inertia member or second flywheel 32 swings back and forth to the extent of the free space (g) relative to the first inertia member or first flywheel 31.

The rotations of the rotary shaft 27 are restricted to a certain extent by the inertia force of the first inertia member or first flywheel 31. In addition to the inertia force of said first inertia member or first flywheel 31, absorption of the energy of external shocks due to the repeated collisions of the collision planes 35a, 36a and the inertia force of the second inertia member or second flywheel 32 effectively suppress the rotations of the shaft 27. As a result, the pipe 51 is kept in a fixed position by the action of the snubbing device.

In other words, when a supported member, for example, a pipe indicates a highly accelerated displacement, then the inertia force of the second inertia member or second flywheel 32 is joined with that of the first inertia member or first flywheel 31 to increase inertia resistance. This increased inertial resistance, combined with absorption of, for example, earthquake shock energy due to the repeated collisions of the collision planes 35a, 36a, prominently suppresses the highly accelerated displacement of the pipe.

The above-mentioned mechanical motion-snubbing feature of this invention is noticeable indicated not only by the first embodiment of FIGS. 1 and 2, but also the other modifications of FIGS. 3 to 5. The modification of FIGS. 4 and 5 has the advantage of freely selecting the weight of additionally provided inertia masses in accordance with the location where the snubbing device is to be set and the desired magnitude of inertial resistance.

The parts of the third embodiment of FIGS. 7 and 8 the same as those of the first embodiment of FIG. 1 are denoted by numerals formed by adding a number 300 to the numerals designating the parts of said first embodiment.

The mechanical motion snubbing device of FIGS. 7 and 8 comprises a first assembly 311 and a second assembly 320. Both assemblies 311, 320 can be relatively moved with respect to each other in the axial direction. The first assembly 311 comprises a fitting member 313, outer protective cylinder 316, inner cylinder 312 and ball-screw mechanism 319 fitted to the free end of said inner cylinder. The second assembly 320 comprises a cylindrical body or casing 321, cap member 322 threadedly fitted to the open end of said casing 321, ball bearings 328 disposed at the center of the cap member 322, a cylinder 324 whose base end is threadedly engaged with the cap member 322 and whose free end is inserted between an outer cylinder 316 and inner cylinder 312, and a fitting member 323 fixed to the end of the casing 321.

Both cylinders 324, 312 can be relatively moved with respect to each other only in the axial direction by engagement between an axially extending key 326 formed on the inner wall of the cylinder 324 and an axially extending keyway 318 formed in the inner wall of the inner cylinder 312.

The second assembly 320 further comprises a rotary shaft 327, which is rotatably supported by the ball bearings 328, while being made axially immovable. One end of the shaft 327 is provided with a threaded portion 329, which is inserted into the inner cylinder 312 through the ball-screw mechanism 319. When the first assembly 311 is axially moved, the shaft 327 is rotated by the joint action of the ball-screw mechanism 319 and the threaded portion 329 which convert the axial movement of the shaft 327 into its rotation.

A toothed member 340 is supported above the proximity of that end of the shaft 327 which is inserted into the casing 321 to be jointly rotated with said shaft 327 by means of a key-and-keyway system 333. The toothed member 340 comprises a pair of integrally formed segmental teeth (FIG. 8) extending in opposite directions along the diameter of the cylindrical inertia member 343. Each segmental tooth 341 has a pair of radially extending lateral planes 341a. A cylindrical inertia mass or member 343 is rotatably supported on the base end of the shaft 327 with a sleeve 342 interposed therebetween. The cylindrical inertia member 343 comprises a cylindrical bore 343a open on one side thereof, in which the toothed member 340 is received. A pair of cutouts 344 having a segmental cross section are formed in the inner wall of the cylindrical bore 343a to receive the paired segmental teeth 341. The segmental cutouts 344 have a greater circumferential length than the segmental teeth 341, thus providing a free space (g) (FIG. 8) therebetween. The arrangement of FIG. 8 resembles that of FIG. 2.

Where, with the embodiment of FIGS. 7 and 8, a gentle external force is applied to a supported member, for example, a pipe and the shaft 327 is slowly rotated, then the cylindrical inertia member 343 is rotated with the toothed member 340 which is also rotated with the shaft 327. In this case, the shaft 327 does not substantially undergo an inertia force. Therefore, both collision planes 341a of the respective teeth 341 of the toothed member 340 are lightly pressed against both collision planes 344a of the respective cutouts 344, thus leading to the joint rotation of the toothed member 340 and inertia member 343.

Where a supported member, for example, a pipe undergoes a sudden external force, and the shaft 327 is quickly rotated, then the toothed member 340 vigorously swings back and forth. Since, however, the inertia member 343 having a considerable inertia can not rotate at a speed corresponding to that at which the toothed member 340 is rotated, the collision planes 341a of the respective teeth 341 repeatedly strike against the collision planes 344a of the cutouts 344. As a result, the rotation of the shaft 327 is immediately and unfailingly suppressed by the absorption of the energy of the above-mentioned sudden external shock due to the repeated collisions of the collision planes 341a, 344a.

Since, in the above-mentioned case, the shaft 327 itself has a considerable inertia force, the toothed member 340 effectively absorbs the energy of an external shock, even if it has a small diameter. Further, the inertia member 343 can be made into a sufficiently large mass to suppress an accelerated displacement of a supported member, for example, a pipe resulting from a sudden external force.

There will now be described by reference to FIGS. 9 and 10 a mechanical motion-snubbing device according to a third embodiment of the invention. The parts of the third embodiment the same as those of the first embodiment are denoted by numerals formed by adding a number 400 to those of the first embodiment.

The third embodiment of FIGS. 9 and 10 is fundamentally based on the second embodiment of FIGS. 7 and 8, the only difference being that the third embodiment comprises an additional inertia mass or member 450. Therefore, description is restricted to an arrangement related to said difference.

A first inertia member 443 and a second cylindrical inertia mass or member 450 are rotatably supported side by side on the rotary shaft 427, with a sleeve interposed between the shaft 427 and both inertia members 443, 450. The additional inertia member 450 has a cylindrical bore 450a open on one side thereof, in which the first inertia member 443 is received.

As illustrated in FIG. 10, a plurality of (three in the third embodiment) segmental projections 452 are equiangularly formed on the peripheral surface of the first inertia member 443. Segmental cutouts 451 are also equiangularly formed in the corresponding number in the inner wall of the bore 450a of the second inertia mass 450, with a free space ($g_2$) allowed for the loose engagement of said segmental projections 452. The mode of engagement between the projections 452 and cutouts 451 is the same as in FIG. 2. Each cutout 451 has two collision planes 451a, and each projection 452 has two collision planes 452a respectively facing the corresponding planes 451a of the cutout 451.

A cylindrical bore 443a cutout in the first inertia member 443 contains a toothed member 440 which consists of, for example, three equiangularly formed segmental teeth 441 and, for example, three equiangularly formed segmental cutouts 444 with a free space ($g_1$) allowed for the loose engagement of said segmental teeth 441. The toothed member 440 is fixed to the shaft 427 by a key-and-keyway system 433.

The members of a first assembly 411 and those of a second assembly 420 are arranged in substantially the same manner as in the second embodiment of FIGS. 7 and 8.

Where, with the snubbing device of the third embodiment, the shaft 427 is slowly rotated, the toothed member 440, and first and second inertia members 443, 450 are slowly rotated in succession by their loose engagement, imparting substantially no inertia force to the shaft 427.

Where a supported member, for example, a pipe is subjected to a sudden external shock such as an earthquake shock and the shaft is quickly rotated in the opposite direction due to the vertical shaking of the pipe, then the toothed member 440, and first and second inertia members 443, 450 also swing back and forth due to the above-mentioned loose engagement within the range defined by the free spaces ($g_1$, $g_2$) to strike against each other. Consequently, the rotations of the shaft 427 in the opposite directions are effectively suppressed by a composition of inertia forces, namely, the joint action of the inertia forces of the first and second inertia members 443, 450 and shaft 427, and the absorption of the energy of an external shock by collisions between the toothed member 440 and first inertia member 443, as well as between the first and second inertia members 443, 450.

The third embodiment of FIGS. 9 and 10 can obviously be modified by adding a third inertia member to the first and second inertia members. With all the foregoing embodiments, the inertia members were rotatably supported on the shaft itself. However, the inertia members need not be directly mounted on the shaft. The inertia members may be rotatably supported, for example, by a casing, provided the inertia members are set concentric with the shaft. This arrangement is, of course, included in the scope of this invention.

With any of the aforesaid embodiments, it is possible to provide graduations on one side of the peripheral surfaces of the protective outer cylinders 16, 316, 416 of the first assembly and the peripheral surfaces of the inner cylinders 24, 324, 424 of the second assembly and indication marks corresponding to said graduations on the other side. This arrangement offers convenience in easily recognizing the relative positions of the first and second assemblies with respect to each other and consequently the degree of displacement of, for example, a pipe resulting from external shocks or changes in ambient temperature.

Throughout the embodiments, the segmental projections are formed in the same size on the peripheral surfaces of the inertia members and toothed member, and the segmental cutouts are formed in the same size in the inner walls of said members, all equiangularly in the circumferential direction. Accordingly, unnecessary moments do not arise in the inertia members and toothed member while they swing back and forth, thereby enabling the snubbing device to be always operated under a stable condition.

As described above, this invention provides a very compact mechanical motion-snubbing device of light weight and simple arrangement which can effectively suppress the displacements or shakings of a supported member, for example, a pipe by a composition of the inertia forces of a plurality of inertia members and the absorption of the energy of external shocks by the collision of the inertia members and further the collision of the engagement teeth of the toothed member. The snubber is formed of mechanical parts and consequently is highly resistant to deterioration by radiation.

What is claimed is:

1. A mechanical motion-snubbing device comprising:
   a pair of telescoped members mounted for relative axial movement with respect to each other, said telescoped members being non-rotatable relative to each other about the longitudinal axes thereof;
   movement-converting means for converting the relative axial movement of said telescoped members into a rotation;
   a shaft supported by one of said paired telescoped members so as to be rotated by said movement-converting means, said shaft being axially fixed;
   a first inertia member fixed to the shaft;
   a second inertia member freely rotatable on an axis of said shaft, said second inertia member being axially fixed and being arranged for unrestrained rotation relative to said first inertia member over a given angle of rotation thereof in both opposite directions of rotation;
   a plurality of segmental cutouts formed in one of said first and second inertia members, said cutouts being formed substantially equiangularly in the circumferential direction of said one inertia member, each of said cutouts defining a pair of collision planes spaced from each other in said circumferential direction; and
   a corresponding plurality of segmental projections formed on the other of said first and second inertia members substantially equiangularly in the circumferential direction of said other inertia member so as to fit into respective corresponding cutouts with a predetermined space left therebetween, each of said projections defining a pair of collision planes spaced from each other in said circumferential direction and facing corresponding collision planes of the cutouts, the circumferential spacing between collision planes of a given projection being less than the circumferential spacing between collision planes of the respective cutout by a given distance, said second inertia member being rotatable unrestrained relative to said first inertia member over said given angle which corresponds to said given distance; whereby upon application of sudden opposing external forces exceeding a given value, the first inertia member rotates relative to said second inertia member such that collision planes of each projection alternately strike against a corresponding collision plane of a respective cutout, whereby said inertia members rotate in respective opposite directions in an alternating manner to produce a composite inertia moment of the first and second inertia members to absorb energy of said opposing external forces.

2. The mechanical motion-snubbing device according to claim 1, comprising an annular additional inertia mass detachably mounted to at least one of said first and second inertia members so as to provide mechanical balance between said shaft and said first and second inertia members.

3. The mechanical motion-snubbing device according to claim 2, comprising a bolt for mounting said annular additional inertia mass to said at least one of said first and second inertia members.

4. The mechanical motion-snubbing device according to claim 1, wherein the first inertia member is fixed to the shaft by a key-and-keyway system.

5. The mechanical motion-snubbing device according to claim 1 or 7 wherein said collision planes are substantially flat.

6. The mechanical motion-snubbing device according to claim 5, wherein said collision planes are oriented such that extensions thereof converge substantially at the center of said shaft.

7. A mechanical motion-snubbing device comprising:
a pair of telescoped members mounted for relative axial movement with respect to each other, said telescoped members being non-rotatable relative to each other about the longitudinal axes thereof;
movement-converting means for converting the relative axial movement of one of said paired telescoped members into a rotation;
a shaft supported by the other of said paired telescoped members and being rotated by said movement-converting means;
a rotary member fixed to said shaft, said rotary member having a plurality of segmental projections formed substantially equiangularly in the circumferential direction of said rotary member, each projection having a pair of end faces spaced from each other in said circumferential direction, both end faces of each projection defining respectively a pair of collision planes; and
an inertia mass supported on said shaft to freely rotate on said shaft, said inertia mass having a central bore for receiving said rotary member therein, said inertia mass having a plurality of segmental cutouts formed substantially equiangularly in the inner wall of said central bore of said inertia mass so as to be loosely engaged with a respective segmental projection of said rotary member with a predetermined space left therebetween, said cutouts each having a pair of circumferentially spaced end faces which respectively define a pair of collision planes which face corresponding collision planes of said segmental projections, the circumferential spacing between collision planes of a given projection being less than the circumferential spacing between collision planes of the respective cutout by a given distance, said inertia mass being freely rotatable unrestrained relative to said rotary member over a given angle which corresponds to said given distance; whereby upon application of sudden opposing external forces exceeding a given value, the rotary member rotates relative to said inertia mass such that collision planes of each projection alternately strike against the corresponding collision planes of each respective cutout, whereby said inertia mass and rotary member rotate in respective opposite directions in an alternating manner to apply the inertia moment of the inertia mass to the shaft through the rotary member to absorb energy of said opposing external forces.

8. The mechanical motion-snubbing device according to claim 7, further comprising:
a second inertia mass supported on said shaft to freely rotate about said shaft and provided with a central bore for receiving said first inertia mass therein, said second inertia mass having a plurality of segmental cutouts formed substantially equiangularly in the inner wall of the central bore of said second inertia mass, both end faces of each cutout of said second inertia mass defining respectively a pair of collision planes;
a plurality of segmental projections formed substantially equiangularly on the outer peripheral surface of said first inertia mass and loosely engaged with corresponding respective segmental cutouts of said second inertia mass with a predetermined space left therebetween, both end faces of each projection of said first inertia mass defining a pair of opposed collision planes spaced closer to each other than the collision planes of the respective cutouts of said second inertia mass, whereby upon application of sudden opposing external forces exceeding a given value, said first inertia mass rotates relative to said second inertia mass such that collision planes of each projection of said first inertia mass alternately strike against the corresponding collision planes of each cutout of said second inertia mass to apply the inertia moment of said second inertia mass to said shaft through said first inertia mass and said rotary member to further absorb the energy of said opposing external forces.

9. The mechanical motion-snubbing device according to claim 7, comprising an annular additional inertia mass detachably mounted to at least one of said rotary member and inertia mass to provide mechanical balance with said shaft.

10. The mechanical motion-snubbing device according to claim 7, wherein said rotary member is fixed to said shaft by a key-and-keyway system.

* * * * *